US007016854B2

(12) United States Patent
Himes

(10) Patent No.: US 7,016,854 B2
(45) Date of Patent: Mar. 21, 2006

(54) LOYALTY LINK METHOD AND APPARATUS WITH AUDIO PERFORMANCE FOR INTEGRATING CUSTOMER INFORMATION WITH DEALER MANAGEMENT INFORMATION

(75) Inventor: Steven G. Himes, Centerville, OH (US)

(73) Assignee: Reynolds & Reynolds Holdings, Inc., Dayton, OH (US)

( * ) Notice: Subject to any disclaimer, the term of this patent is extended or adjusted under 35 U.S.C. 154(b) by 222 days.

(21) Appl. No.: 09/983,174

(22) Filed: Oct. 23, 2001

(65) Prior Publication Data

US 2002/0123933 A1  Sep. 5, 2002

Related U.S. Application Data

(63) Continuation-in-part of application No. 09/725,080, filed on Nov. 29, 2000, now Pat. No. 6,901,374.

(51) Int. Cl.
*G06F 17/60* (2006.01)
(52) U.S. Cl. .............................. 705/1; 705/64; 705/72
(58) Field of Classification Search ................ 705/14, 705/1, 15, 16; 235/380
See application file for complete search history.

(56) References Cited

U.S. PATENT DOCUMENTS

| | | |
|---|---|---|
| 4,159,531 A | 6/1979 | McGrath |
| 4,314,352 A | 2/1982 | Fought |
| 5,058,044 A | 10/1991 | Stewart et al. |
| 5,072,380 A | 12/1991 | Randelman et al. |
| 5,183,142 A | 2/1993 | Latchinian et al. |
| 5,347,632 A | 9/1994 | Filepp et al. |
| 5,459,304 A * | 10/1995 | Eisenmann ............ 235/380 |
| 5,499,181 A | 3/1996 | Smith |
| 5,557,268 A | 9/1996 | Hughes et al. |
| 5,657,233 A | 8/1997 | Cherrington et al. |
| 5,689,100 A | 11/1997 | Carrithers et al. .......... 235/380 |
| 5,931,878 A | 8/1999 | Chapin, Jr. |
| 5,978,777 A | 11/1999 | Garnier |
| 6,024,288 A | 2/2000 | Gottlich et al. ............ 235/493 |

(Continued)

FOREIGN PATENT DOCUMENTS

EP          0924667 A2    6/1999

(Continued)

OTHER PUBLICATIONS

Online service provision system sends technologist to customer on date selected by customer, after searching databases of technologist, agency and delivery center; NEC Software Kansai LTD; p. 1.*

(Continued)

*Primary Examiner*—Pierre Eddy Elisca
(74) *Attorney, Agent, or Firm*—Stephen C. Glazier; Kirkpatrick & Lockhart Nicholson Graham LLP

(57) ABSTRACT

A customer data capture system integrated with a dealership data management system allows customer and vehicle maintenance data to be exchanged between a kiosk on the floor of the dealership and the data management system. The customer inserts a customized card into a kiosk, and interacts with the pre-programmed software on the kiosk. The software recommends scheduled maintenance services and suggests potential coupon savings, based on the information received from the customer's card and the information stored in the data management system. A service order is generated and routed to the service department. As a result, the accuracy and speed of entering customer data are enhanced, while the dealership is able to offer value-added services at the point of sale, thus enhancing the dealership's business relationship with the customer.

31 Claims, 6 Drawing Sheets

U.S. PATENT DOCUMENTS

| | | |
|---|---|---|
| 6,041,310 A | 3/2000 | Green et al. |
| 6,119,933 A | 9/2000 | Wong et al. ................. 235/380 |
| 6,119,945 A | 9/2000 | Muller et al. ................ 235/492 |
| 6,170,742 B1 | 1/2001 | Yacoob ....................... 235/375 |
| 6,188,398 B1 | 2/2001 | Collins-Rector et al. |
| 6,266,647 B1 | 7/2001 | Fernandez |
| 6,311,162 B1 | 10/2001 | Reichwein et al. |
| 6,336,099 B1 | 1/2002 | Barnett et al. ................ 705/14 |
| 6,389,337 B1 | 5/2002 | Kolls |
| 6,409,080 B1 | 6/2002 | Kawagishi |
| 6,505,774 B1 | 1/2003 | Fulcher et al. |
| 2001/0016827 A1 | 8/2001 | Fernandez ................... 705/14 |
| 2001/0025879 A1 | 10/2001 | Kawagishi ................. 235/375 |
| 2002/0016655 A1 | 2/2002 | Joao ............................ 701/35 |

FOREIGN PATENT DOCUMENTS

| | | | |
|---|---|---|---|
| JP | 405257941 A | | 10/1993 |
| JP | 020001331069 A | * | 5/2000 |
| WO | WO 99/63457 | | 12/1999 |

OTHER PUBLICATIONS

U.S. Appl. No. 10/403,448, filed Mar. 31, 2003, Himes.

U.S. Appl. No. 10/461,218, filed Jun. 13, 2003, Himes.

U.S. Appl. No. 09/725,080, filed Nov. 29, 2000, Himes.

Sawyers, Arlena; Dealers use smart cards to bring buyers back; Automotive News; May 2000; p38; dialog copy 2 pages.

No author; RiNG Systems Partners With Reynolds and Reynolds to Provide CRM System to Automotive Retailers; Business Wire; Mar. 2000; dialog copy 2 pages.

"Reynolds and Reynolds Provides Technology Solutions to a New Breed of Automotive Relief"; Business Wire; May 23, 1996.

* cited by examiner

FIG. 5

LOYALTY LINK METHOD AND APPARATUS WITH AUDIO PERFORMANCE FOR INTEGRATING CUSTOMER INFORMATION WITH DEALER MANAGEMENT INFORMATION

This is a Continuation-In-Part of National Application No. 09/725,080 filed Nov. 29, 2000 now U.S. Pat. No. 6,901,374.

FIELD OF THE INVENTION

This invention relates to data management and distribution. Specifically, this invention relates to integrated data management systems comprising card-enabled systems and data management computer systems.

BACKGROUND OF THE INVENTION

Integrated data management systems are critical to developing comprehensive relationships between businesses and their customers. From capturing customer data into a customer database, to producing management and customer reports, an integrated data management system is central to the proper functioning of the business.

However, conventional data management systems are fraught with processes that require data to be entered manually. An operator at an automobile dealership, for example, typically uses a computer and data entry devices, such as a keyboard or similar tools, to enter data about a customer, including the customer's name, address, and purchase order. The manual data entry process is time-consuming, because it requires the operator to communicate with the customer to gather the customer information. This is typically done by providing the customer with a form to be filled in, or by interviewing the customer. After gathering the customer information, the operator then has to enter the customer information into the computer, typically done by typing the data that the customer has provided. In addition to being time-consuming, the process is also prone to error. Miscommunication may occur between the operator and the customer during the data gathering stage, thus affecting the accuracy of the data that the operator enters into the computer system. The operator may also make mistakes while typing the customer data into the computer system, resulting in further inaccuracies in the data that are entered into the computer system.

Apart from the problems associated with manual data entry in conventional data management systems, there is also a frustrated need to offer customers, at the point of sale, the opportunity to take advantage of other value-added services provided by the business. For example, an automobile dealership misses an opportunity to offer additional services to its customers, such as scheduled recommended vehicle services, if the dealership does not know that the customer's automobile has reached a certain mileage.

Similarly, the automobile dealership misses an opportunity to reward loyal customers if the data management system employed by the dealership does not maintain a history of the customers' visits. Thus, there is a need to keep track of the services that a customer has purchased in the past, so that the dealership will be able to build a relationship with that customer, for example, by providing a customer incentive package.

Another problem with conventional systems is the lack of integration with Internet-enabled technologies. As customers become increasingly comfortable with using the Internet to purchase goods and services, there is a growing need to be able to offer Internet-savvy customers with goods and services that have traditionally been offered in brick-and-mortar businesses. For example, there is a need to provide a customer with the ability to schedule services for the customer's automobile by requesting the appointment through the Internet, rather than the traditional method of calling the dealership to make an appointment.

Systems currently exist that use a smart card to store customer information, as well as retailer-defined information, such as coupons and other benefits, but these systems are not integrated into larger management systems. For example, stand alone smart card systems may exist in the automobile retail sale and service industry; however, the existing auto dealership smart card systems do not address the integration into a dealer management system, nor do the smart card systems include Internet-based service and maintenance scheduling.

Thus there is a need for a smart card system integrated with a data management system at the automobile dealer, that improves the speed and accuracy with which dealers can process customers, while making it easier to offer, at the point of sale, other value added services to customers and Internet based services. At the same time, such a system also capitalizes on the opportunity to communicate the dealer philosophy to the customer, further reinforcing the fact that the customer made a good purchase decision.

SUMMARY OF THE INVENTION

The present invention, for the first time, allows integration between the customer and the data management system 190 by providing an automated process to exchange information between the customer and the data management system 190, thus allowing efficient data management and providing the proper environment for developing comprehensive customer relationships.

A preferred embodiment of the present invention is called LoyaltyLink, and comprises a smart card 110 and a kiosk 130. The smart card 110 is custom printed with the dealership's logo and image, and programmed with customer and vehicle information. The kiosk 130 contains a Windows-based computer, touch screen 165, thermal printer 135 and smart card reader 120. On the computer is housed proprietary software that works in conjunction with the smart card 110, a coupon package and a maintenance schedule 202 for the vehicle.

In this preferred embodiment, when a customer buys a vehicle from the dealership, the dealership sends a registration form to the card service provider, such as Reynolds and Reynolds Inc. of Dayton, Ohio. The card service provider prints and programs the card 110 and mails the card to the customer on behalf of the dealership. When the customer comes into the dealership for maintenance services on the vehicle, the customer inserts the card 110 into the kiosk 130 and enters the vehicle's mileage 204. The pre-programmed maintenance schedule 202 and coupon package appears on the screen and the customer, with the assistance of the service advisor, selects the desired maintenance items 209. As maintenance items 209 are selected using selection boxes 208, various pre-programmed coupons are offered to the customer. After selection of the maintenance items 209, a "quick write-up" sheet appears on the screen. The customer and the service advisor can then enter other items of information on the screen to complete the repair order. These fields may include time and date promised, additional contact instructions, additional contact number, service advisor number and other services desired. After completion, the information on this visit is written to the card 110 and two thermal receipts are printed. The first receipt is for the customer, while the second receipt contains the additional information from the quick write-up session and is for the service advisor's use in completing the repair order in the dealer management system.

BRIEF DESCRIPTION OF THE DRAWINGS

FIG. 5 shows a screen display for one embodiment of the present invention.

DETAILED DESCRIPTION OF THE DRAWINGS

Figure 1:
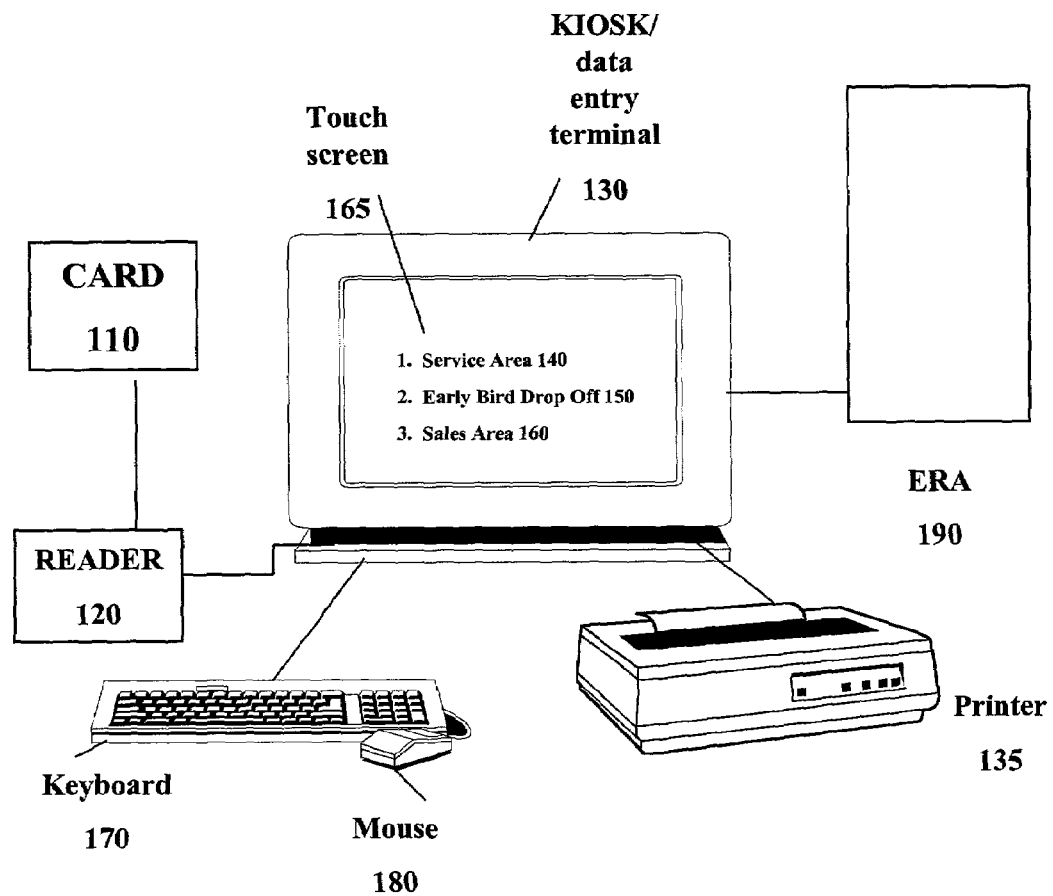
FIG. 1 is a block diagram showing the components of a preferred embodiment of the present invention.

In a preferred embodiment of the invention depicted in FIG. 1, a card 110 is inserted into card reader 120. The card 110 contains customer and vehicle information, including name, address, phone numbers, vehicle identification number (VIN), warranty information and e-mail address. In addition, the card also contains customer-specific maintenance schedules and coupon information, including recommended vehicle maintenance schedules, a record of the customer's last 50 visits, and discounts and free services. The kiosk or data entry terminal 130 is equipped with software that enables it to read and process the information provided by the card 110. For example, the software may offer the customer the option of accessing a service area 140 when the customer's car needs to be repaired, or an option to access the early bird drop off 150 area, when the customer is dropping off the car to be repaired by the dealership. Alternatively, the software may offer the customer the option of accessing a sales area 160, when the customer wants to buy a car.

The customer accesses the desired area through an input device such as the touch-screen 165. In addition, other input devices may also be provided, such as the keyboard 170 or the mouse 180. When the customer has completed his or her session, the data received from the data entry terminal 130 is communicated via cable or radio-frequency (not shown) to the dealer management system 190 ("DMS"). One example of a DMS used in a preferred embodiment is the ERA system 190, developed by Reynolds and Reynolds, Inc. of Dayton, Ohio, but other DMSs may be used in the present invention. The data received from the data entry terminal 130 are used to populate the information fields on the DMS 190. Additional information regarding the selected services, such as labor rates and other prices, are supplied from the DMS 190, and a repair order (not shown) containing the customer information, the vehicle information, and a service description is printed on the printer 135. Also, the repair order and other history of the visit can be written onto the smart card; and other information from the DMS 190 can be written onto the smart card.

Information recorded on the smart card can be read to the PC 130. Information from the DMS 190 can also be read to the PC 130. Likewise, information generated during the user session, such as a repair order, may be generated and recorded in the PC 130 during the user session itself. All this various information can be recorded in data files in the PC. Likewise, supplemental information can be inputted by the user to the PC during the session or after the session through the keyboard 170 and the mouse 180 or the touch screen 165. This supplemental information also can be recorded in data files in the PC. At any time during or after the session all or part of the information in the data files in the PC 130 can be transferred through the reader 120 to the data files in the smart card 110, and any or all of the files may be printed out at the printer 135, or displayed on the touch screen 165, or transferred to and stored in the DMS 190.

In this way information from the smart card and the user session can be saved to the DMS 190 and also printed to the printer 135 and displayed on the touch screen 165. Likewise any information from the DMS 190 and the user session can be saved to the smart card system 110, 120, and printed to the printer 135 and displayed on the touch screen 165.

Figure 2:
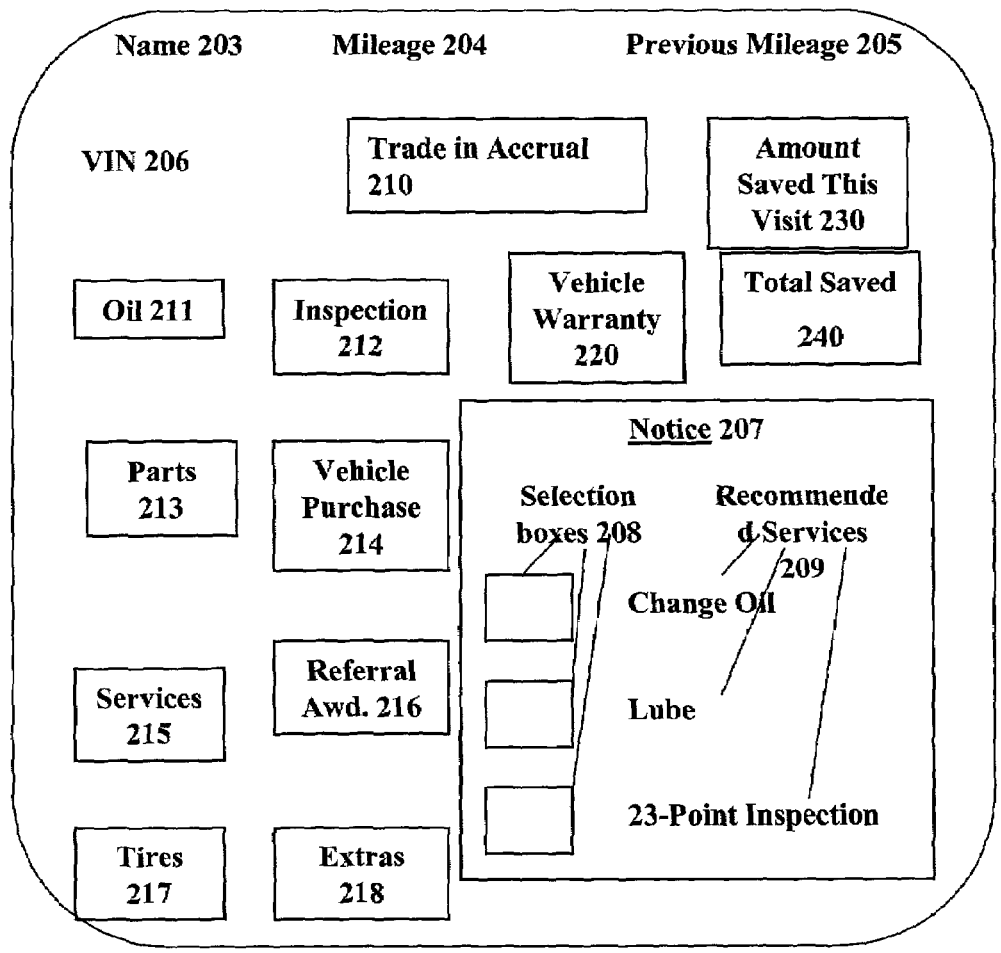
FIG. 2 is a block diagram of a screen display in a preferred embodiment of the present invention.

The preferred embodiment of the present invention improves upon conventional systems by providing data, as shown on FIG. 2, that are not available in conventional systems. For example, the Trade-in Accrual 210 is an amount that can be based on a percentage of the total coupons used to date, or it can be a fixed amount specified by the dealership customer. The vehicle warranty 220 provides the ability to add information regarding the warranty, such as a simple "Yes" or "No", or an actual identification number or description. The Amount Saved This Visit 230 keeps track of the amount of money the customer has saved through the application of various coupons during the current visit. The Total Saved 240 is a cumulative amount the customer has saved during the customer's ownership of the card. Other data on the maintenance schedule screen 202 include: the customer name 203, the mileage 204, the previous mileage 205, the VIN 206, a notice area 207, selection boxes 208, and recommended services 209. The maintenance schedule screen 202 also includes areas for the most-commonly requested departments and functions, such as oil 211, inspection 212, parts 213, vehicle purchase 214, services 215, referral awards 216, tires 217, and extras 218, such as car accessories.

Figure 5:
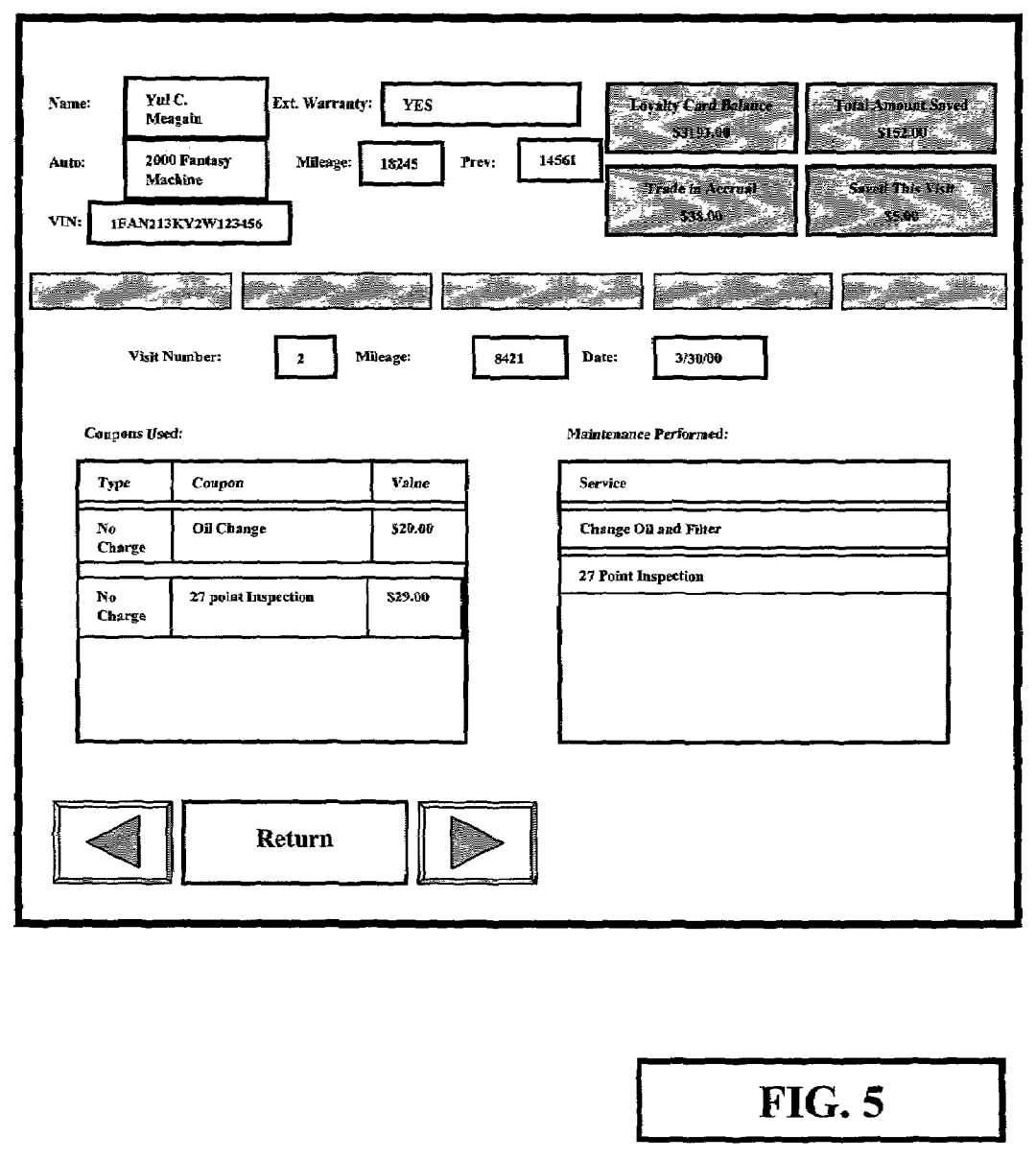
Figure 6:
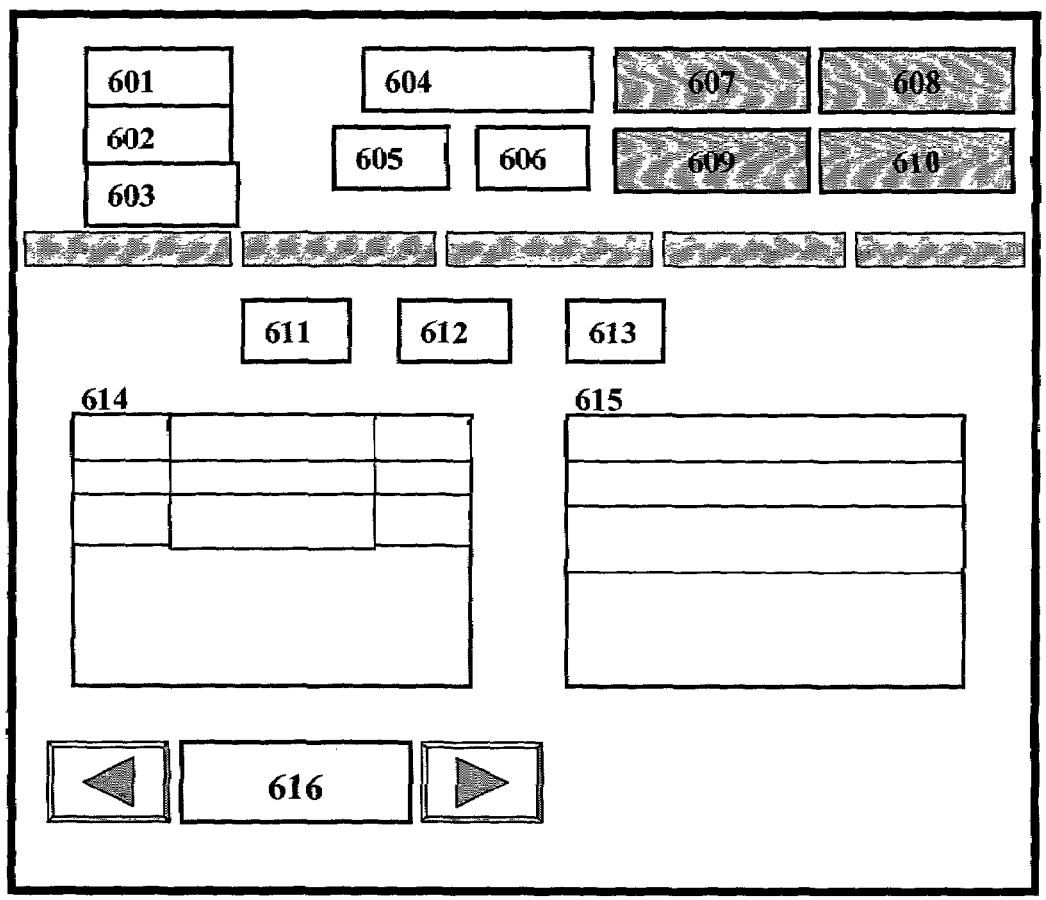
FIG. 6 shows a block diagram of the screen display in FIG. 5.

A wide variety of screen displays may be used. FIG. 5 shows one screen display for one embodiment. The screen display can be presented when a user wants to review the history of the user's visits to the dealer, and certain aspects of the user's current status. This screen can be used in conjunction with other screens in a single session, or exclusively in a session for data review only. FIG. 6 shows a block diagram of FIG. 5.

The various numbered elements of FIG. 6 represent the respective fields in the indicated locations in the actual screen display exhibited in FIG. 5. The name field 601 indicates the name of the customer in the current user session. The auto field 602 indicates the name of the automobile of the user in the current session. The VIN field 603 indicates the VIN of the automobile for the session. The extended warranty field 604 indicates whether or not an extended warranty is currently in affect for the automobile. The mileage field 605 indicates the current mileage of the vehicle. The previous mileage field 606 indicates the mileage of the vehicle at the last recorded visit to the dealership. The Loyalty Card balance field 607 indicates the current balance under the Loyalty Card for that user for that automobile. The total amount saved 608 indicates the total amount saved by the user on this Loyalty Card to date. The trade-in accrual field 609 indicates the trade-in accrual for this customer and vehicle. The save this visit field 610 indicates the amount saved in this visit by this Loyalty Card and its discounts. The visit number element 611 indicates the visit number being recalled on the screen from the smart card. The mileage field 612 indicates the mileage at the time of the visit number in element 611. The date field 613 indicates the date of the visit number in element number 611. The coupons used field 614 indicates the coupons used at the visit number indicated in field 611. The maintenance performed field 615 indicates the maintenance performed at the visit indicated in field 611. The return field 616 allows the user to move to other displays. A variety of displays can be used displaying a variety of information stored on the smart card, or generated at the current user visit for new maintenance and service, or information retrieved from the dealer management system, or other information.

The preferred embodiment also provides unique aspects in its system architecture that are not available in conventional systems. For example, the preferred embodiment provides flexibility through "parameterization" of system options. Most of the features of the system, including graphics, sounds, color schemes, reader interaction, receipt layout and content, and other support functions, are easily configured through a text based parameter file without requiring changes to the code. As a result, system owners are empowered to generate and/or modify coupons and maintenance schedules without contracting to an outside software developer.

Moreover, in the preferred embodiment of the present invention, mutual authentication of the card and the kiosk is provided. Mutual authentication is included as part of new security mechanisms to eliminate the possibility of someone creating a rogue card or making unauthorized modifications to an existing card.

Another unique aspect of the preferred embodiment over conventional systems lies in the storage of transaction data. In the preferred embodiment, transaction data are stored and managed without requiring an external database engine, thus eliminating the need for additional software licenses.

In addition to improvements in system architecture, the preferred embodiment of the present invention provides additional capabilities that are not available in conventional systems. For example, the present invention provides a linkage between the Maintenance Schedule Screen 202 and the Coupon Package (not shown), such that when a customer selects a maintenance item that has an available coupon, the system will automatically prompt the customer to see if the customer wants to apply that coupon.

The preferred embodiment also provides the ability to change customer information on the card 110 such as address, phone numbers, e-mail address, and vehicle warranty information. Changes are stored on the card 110.

Moreover, the preferred embodiment also provides the ability to undo coupons that have been applied accidentally. For example, the customer may mistakenly select a coupon for a specific brand of oil to be used for an oil change. The customer can then use this feature to undo the coupon for the first brand of oil, so that a larger discount for the second brand can be applied. Also, a system administrator may access the system with an Administrator Card or finalize the use session, and undo the customer's action, as described further below.

An electronic keyboard is also provided to facilitate the changing of information or the addition of information. This feature is necessary when the computers 130 on which the software resides are not equipped with external keyboards 170, but instead are equipped only with touch screens 165.

The preferred embodiment further provides Administrator Card Functions to allow administrators to perform specialized functions. For example, an administrator can add store credit to a user's card 110 as a way to resolve a customer complaint. Additional information may be entered into the system to describe the customer's complaint. The administrator may also undo maintenance items and/or coupons that were previously selected and stored on the customer's card 110. An option is provided for the administrator to edit the configuration of the system's parameters file. An administrator may also generate a report of system usage statistics. The system can provide the administrator with a listing of the system's last 10 transactions. The administrator may also set the time and date for the system, as well as shut down the system. The administrator is also provided with the ability to calibrate the touch screen 165, and to exit the session to return the computer 130 to the Windows mode.

The preferred embodiment provides the unique feature of a Quick Write-up Sheet. This screen appears in the form of a service write-up sheet. It contains key customer and vehicle information from the card 110, service items selected from the terminal session, time and date promised, service advisor number, a place to add other services requested that were not on the maintenance schedule, additional customer contact instructions and a place for the customer to sign the form electronically. This information then prints out on a thermal printed tape but is also formatted to print on a laser sheet, if a laser printing device is attached.

The preferred embodiment also provides reporting capabilities that are unique over conventional systems. The receipts that print from the terminal after the session are wider and more easily read. They contain basic consumer and vehicle information, the maintenance items selected, coupons applied, additional non-maintenance schedule services selected, balance, Total Amount Saved and Trade-in Accrual. In addition, reports are provided to list details from the customer's last 50 maintenance sessions, including the date of the visit, services provided and coupons applied. The reports also include a listing of the terminal sessions and the upgraded services that the customer has purchased in the past.

Figure 3:
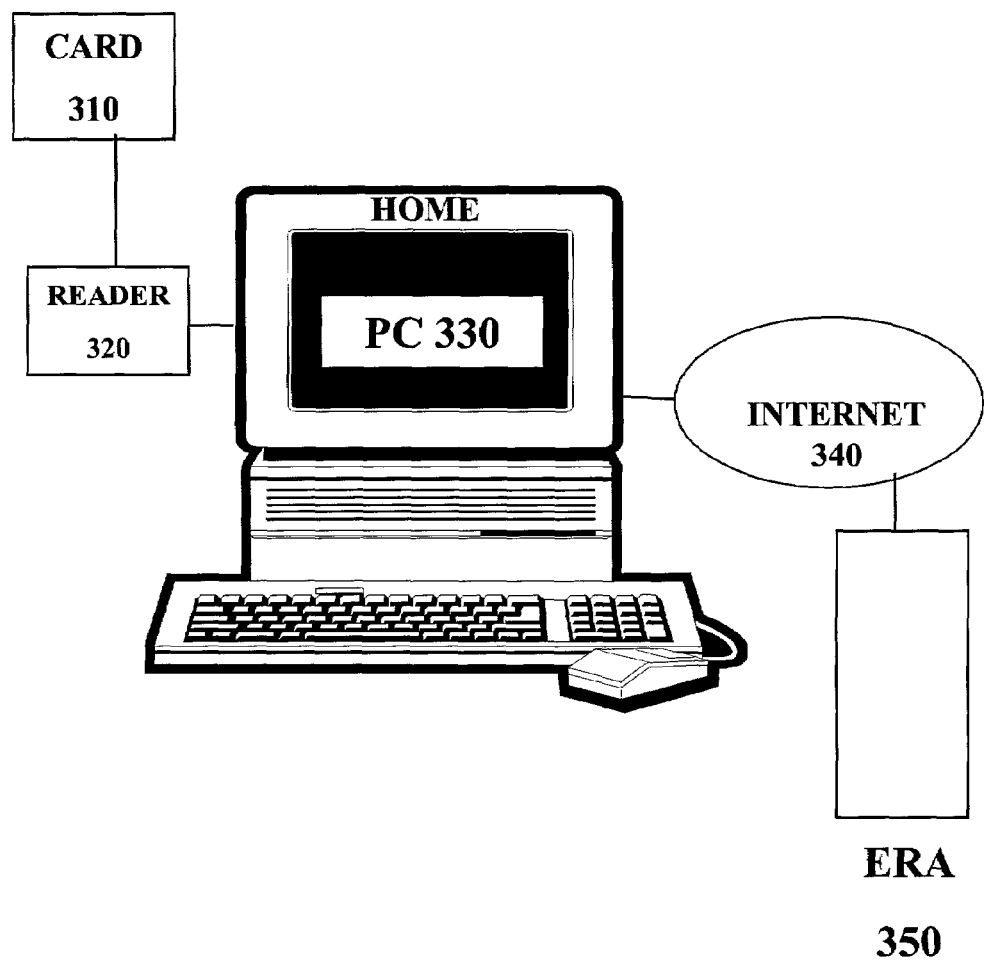
FIG. 3 is a block diagram showing the components of another embodiment of the present invention.

In another embodiment of the present invention, depicted on FIG. 3, the customer uses the card 310 with the card reader 320 connected to a remote personal computer (PC) 330 located, for example, in the customer's home. The PC 330 is equipped with software programmed to perform the above functions, or a subset thereof, and the PC 330 is connected to the Internet 340, which allows the PC 330 to communicate with the ERA system 350, or any other DMS (Dealer Management System) 350 that may be used.

Figure 4:
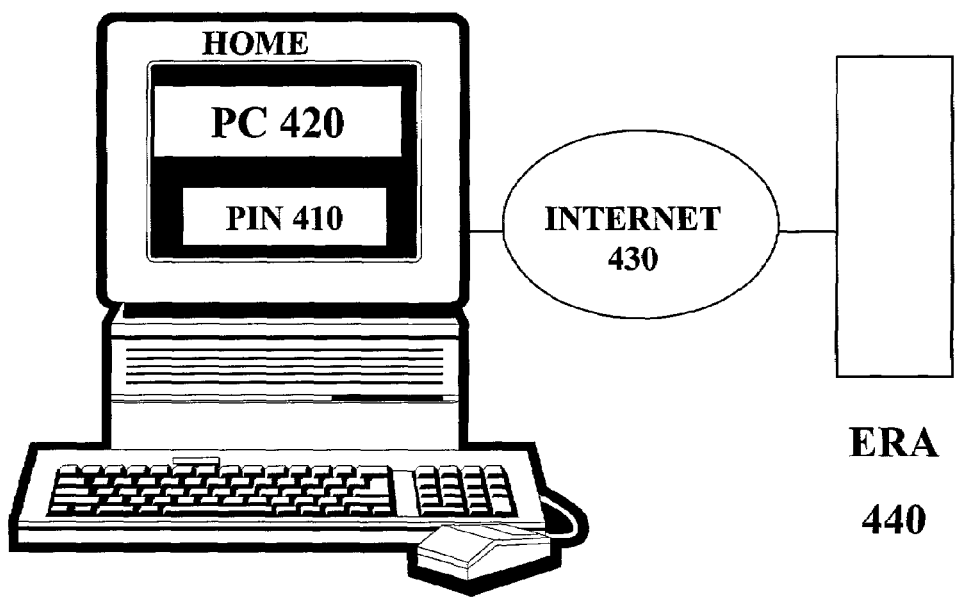
FIG. 4 is a block diagram showing the components of another embodiment of the present invention.

In another embodiment shown on FIG. 4, the customer enters a personal identification number (PIN) 410 while using a remote computer, such as a home PC 420, to initiate communication through the Internet 430 with the ERA system 440 or any other dealer management system 440. The PIN 410 ensures that the environment is secure for customers to exchange data with the ERA system 440, or any other dealer management system 440.

A preferred embodiment of the present invention includes a multiple languages capability. Any written language can be accommodated. English and Spanish are preferred in one embodiment. In one embodiment, a language selection icon is displayed on the screen display 165, which activates a language selection menu, allowing the choice of the preferred language. Alternatively, the preferred language can be selected through the keyboard. All text in stored messages to be printed or displayed, and all screen display text templates, are stored in all the various alternative languages that may be selected. Selection of a chosen language will result in only the versions of messages and screen displays being used that use that language exclusively. The alternative messages and screen displays for the Smart Card System (SCS) may be stored within the kiosk of the SCS, and those of the dealer management system (DMS) may be stored in the DMS. Each message or display in each language will select a separate INI file for that message or display in the selected language.

One embodiment of the present invention may also contain pop-up video screens with full audio. These may be pre-recorded video clips showing a dealership representative talking to the customer using the invention, during the sales cycle. A clip can pop up at any time in the use cycle of the invention triggered by user action appropriate to that clip, or other events. In one embodiment, each video clip would be a line of code in parameters in an INI file, and may be in a Windows environment. In this embodiment, a gold bar may be displayed on the display screen 165. Clicking on the bar would activate the video clip. The video clips maybe stored within the kiosk 130, on the DMS 190 server, and can be in various formats including AVI.

While the present invention has been described in connection with what are presently considered to be the most practical and preferred embodiments, it is to be understood that the invention is not limited to the disclosed embodiments. On the contrary, the present invention is intended to cover various modifications and equivalent arrangements included within the spirit and scope of the appended claims. The invention may be implemented as a hardware/software combination, a programmable apparatus, a method executed by a programmable apparatus, or as software on a machine readable memory medium, which when loaded and executed can cause a programmable apparatus to execute the method, or by other implementations.

In an alternative embodiment, the Smart Card System (SCS) may exist as a standalone system, but with all the novel features and functions described herein that are enabled without communication with any Dealer Management System. These standalone features of the SCS may include (1) using a data entry station or component with a computer touch screen with an electronic keyboard, a keyboard, and a mouse, in which the station may be a personal computer (PC), (2) receiving inputted data comprising customer information, vehicle information, maintenance schedule information and coupon information, (3) receiving supplemental data comprising current mileage, selected customer services, additional contact instructions, additional contact number, and promised date and time of completion, (4) receiving response data comprising recommended services, a savings during a visit, and total savings amount to date, (5) receiving input data comprising a Personal Identification Number (PIN), (6) receiving input data comprising administrative data that permit functions to be reserved for a system administrator, (7) checking access authorization of the input data from the user, (8) displaying means to display or popup the video clip, and (9) selecting a language from a plurality of language choices for use in any printed and displayed text.

The SCS, whether in a standalone mode or communicating with a Dealer Management System, may be embodied in a kiosk on a floor or a similar device mounted on a wall. Alternatively, the SCS may be embodied in a hand portable, wireless or wire communicating device including a Smart Card reader, a Display Screen, and a printer. In the hand portable embodiment, the SCS maybe totally self contained or may communicate wirelessly or by wire to a central SCS server.

The preferred embodiment is for automobile dealerships, but other vehicle dealerships, or other product retail and service locations, may be used. The preferred embodiments use electronic, optic, wired, and wireless communication links, but any other communication links may be used.

In a further embodiment, the Trade-in Accrual 210 may be an amount that is based on a percentage of the value of services selected. Optionally, the Trade-in Accrual may additionally include the original or amortized cost of an extended warranty associated with the trade-in.

The system may also require administrator approval by, for example, insertion of the Administrator Card to permit the provision and/or application of certain coupons or other credits. For example, the application by a customer of coupons over a certain value may require administrator approval by insertion of the Administrator Card or similarly, the provision through the system of a certain class of coupons to a customer may require administrator approval.

In another embodiment, the system may provide audio instructions to a customer regarding information presented on screen displays of the system. The audio instructions, for example, may include voice instructions to a user on how to complete fields on the screen display and to select certain buttons in order to complete a screen. While such audio instructions may be coordinated with certain pop up video clips presented on the screen display, such coordination is not required, e.g., a pop up video clips may be unrelated or operate independently of the voice instructions provided in association with a screen display. Table 1 provides the script for certain exemplary audio voice instructions of an embodiment of the system. For example, in the case of the Mileage Screen, the screen display depicts a field to enter a customer's mileage and the audio voice instruction that would be provided to the customer is "Please enter your vehicle's current mileage by touching the numbers on the screen. Touch the green button marked OK when finished."

TABLE 1

Loyalty Link Voice Over Script

Mileage Screen

"Please enter your vehicle's current mileage by touching the numbers on the screen. Touch the green button marked OK when finished."

VIN not Found Screen

"Your vehicle's identification number was not found in the system. Touch the green OK button to continue."

VIN not Found Screen-2

"Your vehicle's identification number was not found in the system. Touch the green OK button to continue. Verify that the ERA Make Code selected is correct or use the drop down menu to select an alternative make code. Continue entering the mileage on the number pad and press the green OK button when finished."

Please Verify Mileage Screen

"Touch the green OK button to return to the Mileage Screen then verify that the mileage entered is correct. Correct the vehicle mileage, if necessary, and touch the green OK button on the number pad screen when finished."

Maintenance Screen

"Please select the maintenance services to be performed by touching the box to the left of each item. Select any additional coupons to be used by touching the appropriate category on the left and selecting the coupon inside. Touch the green Continue button at the bottom of the screen when finished."

TABLE 1-continued

Loyalty Link Voice Over Script

"Touch the blue Options button to update current information on the card or to check your recent maintenance history."
"Touch the red Cancel button to exit the session and return to the Welcome screen."
Coupon Screen "Please select any available coupons by touching the coupon. Available coupons are denoted by the green color. Touch the Return button when finished."
Options Screen "Please touch the appropriate button and follow on screen instructions. Touch the Return button at the bottom of the screen to return to the Maintenance screen."
Caution Screen "There are some past due maintenance items. Please select any of the past due maintenance items to be performed by touching the box next to each item. Touch the green Continue button at the bottom of the screen when finished."
Congratulations Screen "Congratulations, you have no past due maintenance items. Touch the green Continue button at the bottom of the screen when finished."
Quick Repair Order Screen "Enter additional comments on the Repair Order Information section on the left side of this screen by touching the small gray box in the lower right corner of each category.
When finished select from these options:
Touch the blue Send to Service and Update the Card button to schedule your selected maintenance items, update your card's information and print your receipt.
Touch the green Update Card Only button to update your card and print your receipts.
Touch the gray Print Quick Repair Order button to receive an exact copy of the Repair Order Information screen.
Touch the red Cancel button to return to the prior screen."
Information Sent to ERA text box "Your selected maintenance items have been scheduled. Please touch the green OK button to continue."
Receipt Printing "Two receipts are now printing. Please take the first receipt for your records. Take the second receipt to the service desk for help in completing this transaction. Thank you for your business."
Service Advisor Number Missing "Please enter a valid service advisor number in the upper left corner of the Repair Order Screen or see the service desk for additional help. Touch the green OK button to continue."
Connection Error "Please see a service advisor or refer to the operations manual for assistance. Touch the green OK button to continue."
General Error "An error has occurred in the system. Please see a service advisor for additional help."

To implement the audio voice instructions in the system, referring to FIGS. 1, 3 and 4, the kiosk, data entry terminal or remote computer in an embodiment of the system would have a sound card and a speaker (not shown) to provide audio to a user of the system. Further, one or more audio files corresponding to the audio instructions are stored in the the dealer database system and/or the kiosk or data terminal. Then, whenever the software of the kiosk or data terminal causes the display of a screen having audio voice instructions associated therewith, the software would cause all or a portion of the relevant audio file(s) containing those audio voice to be played via the sound card and through the speaker to the user of the system. In an embodiment, for every display screen requiring user interaction, the software of the system would search and find, in the kiosk or data terminal of the system, .WAV files by name that are associated with the display screen, each .WAV file comprising an audio voice instruction. The software would then cause the .WAV file(s) containing the audio voice instructions associated with the display screen to be played, whether by using functionality embedded within the software or by using another software application specifically designed to play such files.

As will be apparent to those skilled in the art, many variations of the above audio instructions embodiment are possible and which are within the scope of the invention. For example, other types and formats of audio file(s) other than .WAV files can be used, including without limitation Motion Picture Experts Group (MPEG) files or traditional electromagnetic audio tapes. Further, the audio voice instructions may be generated from corresponding text instructions by software well-known in the art that will render voice audio from text. Such generated audio voice instructions may be created by the software using, for example, human voice in .WAV or similar types of files or using a "computer" voice defined within the software. Optionally, audio voice instructions may be provided by a live customer service agent through the kiosk or data terminal via, for example, a network connection to the DMS.

Loyalty Link is a trademark of Reynolds and Reynolds Holdings, Inc.

Loyalty Card is a trademark of Ring Systems, Inc.

What is claimed is:

1. A machine readable memory medium containing instructions which, when executed by a programmable apparatus, cause the apparatus to perform a system integration method, the method comprising:
   a. storing and accessing information regarding vehicle dealership activities with a smart card system (SCS); and
   b. communicating between a vehicle dealership management system (DMS) and the smart card system, using a communication link between the SCS and DMS:
   wherein
      1. the DMS and SCS are adapted to access data stored on a smart card and store the accessed data in the DMS, and print and display the accessed data,
      2. the DMS and SCS are adapted to access data stored in the DMS and store the accessed data on the SCS, and to print and display the accessed data,
      3. the DMS and SCS are adapted to generate data in a user session and store the generated data in the DMS, and in the SCS, and to print and to display the generated data,
      4. the SCS is adapted to provide audio instructions regarding the accessed data in the DMS, the accessed data on the SCS and the generated data, and
      5. the SCS is adapted to receive input of supplemental data and store the inputted data in the DMS, and in the SCS, and to print and to display the inputted data,
   and further wherein the SCS comprises
      1. a plurality of smart cards,
      2. a smart card reader, adapted to read the smart cards,
      3. a data entry station, communicating with the smart card reader,
      4. a printer, communicating with the data entry station,
      5. checking means to check access authorization of the input data from the user,
      6. displaying means to display pop up video clips, 7. audio performing means to provide audio instructions, and
8. selecting means to select language from a plurality of choices for use in any printed and displayed text;

and wherein the communication link is selected from the group comprising: radio transmission, cable transmission, the Internet, leased telephone lines, wire, optical fiber, and wireless communication;

and further wherein the data entry station is selected from a group consisting of a data entry station that comprises:
a. a kiosk including a computer touch screen with an electronic keyboard,
b. a speaker,
c. a keyboard, and
d. a mouse;

and a data entry station that comprises a PC computer with a display screen, a speaker, a keyboard, and a mouse; and further where the SCS receives:
a. inputted data comprising customer information, vehicle information, maintenance schedule information, coupon information, personal identification number (PIN), and administrator data that permit functions to be performed that are reserved for a system administrator;
b. supplemental data comprising current mileage, selected customer services, additional contact instructions, additional contact number and promised date and time of completion; and
c. response data comprising recommended services, a savings amount during a visit, and total savings amount to date.

2. A machine readable memory medium containing instructions which, when executed by a programmable apparatus, cause the apparatus to perform a system integration method, the method comprising:

storing and accessing information regarding vehicle dealership activities with a smart card system (SCS), the vehicle dealership activities including providing maintenance of automotive vehicles, the SCS configured to store and access customer information, vehicle information, and maintenance schedule information; and communicating between a vehicle dealership management system (DMS) and the smart card system using a communication link between the SCS and DMS, the DMS configured to track costs and savings associated with maintenance provided by a vehicle dealership and to provide a customer incentive package including one or more incentives selectively offered based at least in part on the maintenance schedule information.

3. The invention in claim 2 where:
a. the DMS and SCS are adapted to access data stored on a smart card and store the accessed data in the DMS, and print and display the accessed data,
b. the DMS and SCS are adapted to access data stored in the DMS and store the accessed data on the SCS, and to print and display the accessed data,
c. the DMS and SCS are adapted to generate data in a user session and store the generated data in the DMS, and in the SCS, and to print and to display the generated data,
d. the SCS is adapted to provide audio instructions regarding the accessed data in the DMS, the accessed data on the SCS and the generated data, and
e. the SCS is adapted to receive input of supplemental data and store the inputted data in the DMS, and in the SCS, and to print and to display the inputted data.

4. The invention in claim 2, where
a. the SCS comprises:
1. a plurality of smart cards,
2. a smart card reader, adapted to read the smart cards,
3. a data entry station, communicating with the smart card reader, and
4. a printer, communicating with the data entry station; and wherein
b. the communication link is selected from the groups comprising: radio transmission, cable transmission, the Internet, leased telephone lines, wire, optical fiber, and wireless communication.

5. The invention in claim 4, where the data entry station comprises:
a. a kiosk including a computer touch screen with an electronic keyboard,
b. a speaker,
c. a keyboard, and
d. a mouse.

6. The invention in claim 4, where
a. the data entry station is a PC computer with a display screen, a speaker, a keyboard, and a mouse, and
b. the communication link is the Internet.

7. The invention in claim 4 where the SCS receives inputted data comprising coupon information.

8. The invention in claim 4 where the SCS receives supplemental data comprising current mileage, selected customer services, additional contact instructions, additional contact number and promised date and time of completion.

9. The invention in claim 4 where the SCS receives response data comprising recommended services, a savings amount during a visit, and total savings amount to date.

10. The invention in claim 4 where the SCS receives response data comprising a trade-in accrual that includes an amount based on any of a percentage of coupons used to date, a fixed amount specified by a customer, or a percentage of a value of services selected.

11. The invention in claim 10 where the trade-in accrual further comprises a cost of an extended warranty associated with a trade-in.

12. The invention in claim 4 where the SCS receives input data comprising a personal identification number (PIN).

13. The invention in claim 4 where the SCS receives input data comprising administrator data that permit functions to be performed that are reserved for a system administrator.

14. The invention in claim 4 where approval by a system administrator is required to permit provision and/or application of a coupon.

15. The invention in claim 4, further comprising checking access authorization of the input data from the user.

16. The invention in claim 4 where the SCS further comprises displaying means to display pop up video clips.

17. The invention in claim 4 further comprising selecting a language from a plurality of choices for use in any printed and displayed text.

18. The invention in claim 2, where the data entry station comprises:
a. a kiosk including a computer touch screen with an electronic keyboard,
b. a speaker,
c. a keyboard, and
d. a mouse.

19. The invention in claim 2, where
a. the data entry station is a PC computer with a display screen, a speaker, a keyboard, and a mouse, and
b. the communication link is the Internet.

20. The invention in claim 2 where the SCS receives inputted data comprising coupon information.

21. The invention in claim 2 where the SCS receives supplemental data comprising current mileage, selected customer services, additional contact instructions, additional contact number and promised date and time of completion.

22. The invention in claim 2 where the SCS receives response data comprising recommended services, a savings amount during a visit, and total savings amount to date.

23. The invention in claim 2 where the SCS receives response data comprising a trade-in accrual that includes an amount based on any of a percentage of coupons used to date, a fixed amount specified by a customer, or a percentage of a value of services selected.

24. The invention in claim 23 where the trade-in accrual further comprises a cost of an extended warranty associated with a trade-in.

25. The invention in claim 2 where the SCS receives input data comprising a personal identification number (PIN).

26. The invention in claim 2 where the SCS receives input data comprising administrator data that permit functions to be performed that are reserved for a system administrator.

27. The invention in claim 2 where approval by a system administrator is required to permit provision and/or application of a coupon.

28. The invention in claim 2, further comprising checking access authorization of the input data from the user.

29. The invention in claim 2 where the SCS further comprises displaying means to display pop up video clips.

30. The invention in claim 2 further comprising selecting a language from a plurality of choices for use in any printed and displayed text.

31. A machine readable memory medium containing instructions which, when executed by a smart card system (SCS), cause the SCS to perform a method comprising:
   a. receiving input data on a plurality of smart cards,
   b. reading the smart cards with a smart card reader,
   c. entering and displaying data on a data entry station, said data entry station communicating with the smart card reader,
   d. printing data with a printer, said printer communicating with the data entry station,
   e. checking an access authorization of the input data from the user,
   f. displaying pop up video clips,
   g. providing audio instructions, and
   h. selecting a language from a plurality of choices for use in any printed and displayed text;
wherein the data entry station is selected from a group consisting of:
a data entry station that comprises:
   a. a kiosk including a computer touch screen with an electronic keyboard,
   b. a speaker,
   c. a keyboard, and
   d. a mouse;
and a data entry station that comprises a PC computer with a display screen, a speaker, a keyboard, and a mouse;
and further where the SCS receives:
   a. inputted data comprising customer information, vehicle information, maintenance schedule information, coupon information, personal identification number (PIN), and administrator data that permit functions to be performed that are reserved for a system administrator;
   b. supplemental data comprising current mileage, selected customer services, additional contact instructions, additional contact number and promised date and time of completion; and
   c. response data comprising recommended services, a savings amount during a visit, and total savings amount to date;
and further where the SCS is adapted
   a. to store and access information regarding vehicle dealership activities;
   b. to generate data in a user session and store the generated data in the SCS, and to print and to display the generated data;
   c. to provide audio instructions regarding the generated data, and
   d. to receive input of supplemental data and store the inputted data in the SCS, and to print and display the inputted data.

\* \* \* \* \*